(12) United States Patent
Njaastad

(10) Patent No.: US 9,339,056 B2
(45) Date of Patent: May 17, 2016

(54) SEAL AND ANTI FOAM DEVICE

(71) Applicants: Cornelius, Inc., St. Paul, MN (US); Starbucks Corporation, Seattle, WA (US)

(72) Inventor: David K. Njaastad, Palatine, IL (US)

(73) Assignees: Cornelius, Inc., St. Paul, MN (US); Starbucks Corporation, Seattle, WA (US)

( * ) Notice: Subject to any disclaimer, the term of this patent is extended or adjusted under 35 U.S.C. 154(b) by 90 days.

(21) Appl. No.: 14/245,717

(22) Filed: Apr. 4, 2014

(65) Prior Publication Data

US 2014/0302212 A1 Oct. 9, 2014

Related U.S. Application Data

(60) Provisional application No. 61/808,317, filed on Apr. 4, 2013.

(51) Int. Cl.
| | |
|---|---|
| *A23L 2/54* | (2006.01) |
| *B01F 3/04* | (2006.01) |
| *B01F 13/00* | (2006.01) |
| *B67D 1/00* | (2006.01) |
| *F16L 23/16* | (2006.01) |
| *F16J 13/24* | (2006.01) |
| *B01F 15/00* | (2006.01) |

(52) U.S. Cl.
CPC ............... *A23L 2/54* (2013.01); *B01F 3/04794* (2013.01); *B01F 3/04808* (2013.01); *B01F 3/04829* (2013.01); *B01F 13/0033* (2013.01); *B01F 15/00779* (2013.01); *B67D 1/0057* (2013.01); *F16J 13/24* (2013.01); *F16L 23/16* (2013.01)

(58) Field of Classification Search
CPC .... A23L 2/54; B01F 3/04829; B01F 3/04794; B01F 3/04808; B01F 13/0033; B01F 15/0079; F16L 23/16; B57D 1/0057
See application file for complete search history.

(56) References Cited

U.S. PATENT DOCUMENTS

| | | |
|---|---|---|
| 1,561,036 A | 11/1925 | Sugden |
| 1,960,640 A | 5/1934 | Lajeunesse |
| 2,006,313 A | 6/1935 | Geddes |
| 2,556,038 A | 6/1951 | Kollsman |
| 4,208,903 A | 6/1980 | Hopper et al. |
| 4,251,473 A | 2/1981 | Gilbey |

(Continued)

FOREIGN PATENT DOCUMENTS

| | | |
|---|---|---|
| WO | 0187472 | 11/2001 |
| WO | 2012162762 A1 | 12/2012 |

OTHER PUBLICATIONS

Sodastream webpage [online], [retrieved on Oct. 8, 2012] Retrieved from the Internet:<URL:www.sodastream.com/fizz/>, (1 page).

(Continued)

*Primary Examiner* — Anthony Weier
(74) *Attorney, Agent, or Firm* — Andrus Intellectual Property Law, LLP

(57) ABSTRACT

A carbonation apparatus includes a pressure vessel includes a cap that has a gas inlet and a gas outlet. The carbonation device also includes a seal. The seal includes a labyrinth preventing contact of a liquid within the pressure vessel with the cap during a carbonation process. A locking mechanism removably locks the cap and seal and antifoam device relative to the pressure vessel.

24 Claims, 5 Drawing Sheets

(56) References Cited

U.S. PATENT DOCUMENTS

| | | | |
|---|---|---|---|
| 4,323,090 A | 4/1982 | Magi | |
| 4,481,986 A | 11/1984 | Meyers | |
| 4,518,541 A | 5/1985 | Harris | |
| 4,719,056 A | 1/1988 | Scott | |
| 4,785,973 A | 11/1988 | Kobe | |
| 4,850,269 A | 7/1989 | Hancock et al. | |
| 4,869,396 A | 9/1989 | Horino et al. | |
| 4,940,212 A | 7/1990 | Burton | |
| 4,999,140 A | 3/1991 | Sutherland et al. | |
| 5,118,009 A | 6/1992 | Novitsky | |
| 5,156,871 A | 10/1992 | Goulet et al. | |
| 5,192,513 A | 3/1993 | Stumphauzer et al. | |
| 5,260,081 A | 11/1993 | Stumphauzer et al. | |
| 5,299,715 A | 4/1994 | Feldman et al. | |
| 5,460,846 A | 10/1995 | Stumphauzer et al. | |
| 5,531,254 A | 7/1996 | Rosenbach | |
| 5,549,037 A | 8/1996 | Stumphauzer et al. | |
| 5,592,867 A | 1/1997 | Walsh et al. | |
| 6,041,970 A | 3/2000 | Vogel et al. | |
| 6,073,811 A | 6/2000 | Costea et al. | |
| 6,092,811 A * | 7/2000 | Bojarczuk | F16J 15/122 277/627 |
| 6,167,718 B1 | 1/2001 | Halimi et al. | |
| 6,439,549 B1 | 8/2002 | Loov et al. | |
| 6,530,400 B2 | 3/2003 | Nelson | |
| 6,869,081 B1 * | 3/2005 | Jenco | F16L 23/003 277/611 |
| 7,114,707 B2 | 10/2006 | Rona et al. | |
| 7,255,353 B2 * | 8/2007 | Caplain | F16J 15/128 277/538 |
| 7,267,247 B1 | 9/2007 | Crunkleton, III et al. | |
| 2007/0158371 A1 | 7/2007 | Lupfer | |
| 2010/0096040 A1 | 4/2010 | Litto | |
| 2011/0020508 A1 | 1/2011 | Santoiemmo | |
| 2011/0113972 A1 | 5/2011 | Tatera | |
| 2011/0115103 A1 | 5/2011 | Tatera | |
| 2011/0180565 A1 | 7/2011 | Racino et al. | |
| 2011/0226343 A1 | 9/2011 | Novak et al. | |
| 2011/0300275 A1 | 12/2011 | Lackey et al. | |
| 2012/0098148 A1 | 4/2012 | Koslow et al. | |
| 2012/0292790 A1 | 11/2012 | Tatera | |
| 2013/0106690 A1 | 5/2013 | Lim | |
| 2014/0099405 A1 | 4/2014 | Boarman et al. | |
| 2014/0255574 A1 | 9/2014 | Njaastad et al. | |

OTHER PUBLICATIONS iSi Twist 'N Sparkle Beverage Carbonating System YouTube video [online], isinorthamerica Mar. 23, 2011 [retrieved on Mar. 11, 2014] Retrieved from the Internet: <URL:www.youtube.com/watch?v=ySSXdwTs-cY>, (3 pages).

Perlini Carbonated Cocktail System YouTube video [online] Perlage Systems Jan. 11, 2010 [retrieved on Mar. 11, 2014] Retrieved from the Internet: <URL:www.youtube.com/watch?v=fhle9b4mjC4&feature=relmfu>, (3 pages).

Sodastream, Video Demo [online], [retrieved on Mar. 11, 2014] Retrieved from the Internet: <URL:www.sodastreamusa.com/PopUps/VideoDemo.html>, (1 page).

Fulcher How to Use the SodaStream Jet YouTube Feb. 11, 2012 [retrieved on Feb. 26, 2014] Retrieved from the Internet:<URL:http:www.youtube.com/watch?v=bf9MVEel5XM> entire video, (8 pages).

ISR and Written Opinion PCT/US2014/022048 mailed Jun. 27, 2014, (10 pages).

ISR and Written Opinion PCT/US2014/033040 mailed Aug. 27, 2014, (7 pages).

ISR and Written Opinion PCT/US2013/065763 mailed Mar. 18, 2014, (13 pages).

International Preliminary Report on Patentability, PCT/US2014/033040, date of mailing Oct. 15, 2015.

IPRP for International Patent Application No. PCT/US2014/022048 mailed Feb. 18, 2015 (9 pages).

IPRP for International Patent Application No. PCT/US2013/065763 mailed Sep. 25, 2014 (16 pages).

ISR and Written Opinion for International Patent Application No. PCT/US2014/040509 mailed Oct. 1, 2014 (11 pages).

* cited by examiner

SEAL AND ANTI FOAM DEVICE

CROSS REFERENCE

This application claims priority to U.S. Provisional Patent Application Ser. No. 61/808,317 filed on Apr. 4, 2013. The content of that prior application is incorporated herein by reference in its entirety.

FIELD OF THE INVENTION

The invention relates to seals and antifoam devices that may be utilized in a carbonation apparatus and methods for forming a carbonated batch of a finished beverage.

BACKGROUND OF THE INVENTION

Current carbonated beverages may be formed by using a carbonator to carbonate a water source and then introducing a flavored syrup concentrate to make a carbonated beverage. Additionally, prior art apparatus may include a small CO2 cartridge that introduces carbonation under pressure into a vessel of water, to which syrup or other ingredients are added to create a finished beverage.

However, prior art carbonation apparatus are limited in an amount of carbonation that they introduce to the beverage because they do not agitate the beverage or have the ability to vary the pressure to influence a carbonation level. Additionally, typical prior art apparatus may be utilized to only carbonate a water source and do not carbonate a finished beverage or allow for the carbonation of customized different beverages without cross contamination.

There is therefore a need in the art for a method and apparatus for fast carbonation of a pre-mixed beverage or final finished beverage on an individual basis such that the carbonation level may be adjusted to various levels. There is also a need in the art for a seal and antifoaming device that prevents liquid from exiting a pressure vessel during a venting procedure to prevent contamination of the carbonation apparatus. There is a further need in the art for a seal and antifoaming device that separates a liquid and gas during the venting process and is easy to clean and is reusable.

SUMMARY OF THE INVENTION

In one aspect, a seal for use with a pressure vessel and cap is disclosed. The seal and antifoam device includes a body formed of a sealing material. The body includes a sealing edge that contacts the pressure vessel and cap sealing the cap relative to the pressure vessel. The seal includes a labyrinth preventing contact of a liquid within the pressure vessel with the cap during a carbonation process.

In another aspect, there is disclosed a carbonation apparatus that includes a pressure vessel with a cap that has a gas inlet and a gas outlet. The carbonation device also includes a seal. A locking mechanism removably locks the cap and seal and antifoam device relative to the pressure vessel. The seal includes a labyrinth preventing contact of a liquid within the pressure vessel with the cap during a carbonation process.

In another aspect, there is disclosed a method of forming a carbonated beverage in a batch that includes the steps of: providing a carbonation device; providing a locking mechanism; providing a pressure vessel including a cap, the cap including a gas inlet and a gas outlet, introducing a liquid beverage into the pressure vessel; locking a seal and cap relative to the pressure vessel using the locking mechanism; introducing gas at a specified pressure for a predetermined time and agitating the liquid beverage forming a carbonated beverage wherein the seal includes a labyrinth preventing contact of a liquid within the pressure vessel with the cap during a carbonation process.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

In general, the carbonation process may be described utilizing Henry's Law which states that at a constant temperature the amount of a given gas that is dissolved in a given type and volume of liquid is proportional to the partial pressure of that gas in equilibrium with the liquid. By controlling the CO2 pressure at varying levels the amount of dissolved gas being absorbed allows a user to create beverages having varying amounts of carbonation to create a different taste and feel to the human palate.

The apparatus and method of the present invention may be implemented by placing a finished beverage which may include water, flavoring, syrups and other additives in a pressure vessel and pressurizing it with CO2 to allow the gas to saturate the liquid creating a carbonated beverage. By controlling the CO2 pressure introduced into the pressure vessel, the level of carbonation in a drink can be changed from a highly carbonated liquid to a lower level carbonated liquid. Agitation of the liquid within the pressure vessel reduces the time needed to saturate the liquid and improves accuracy of the carbonation.

Figure 1:
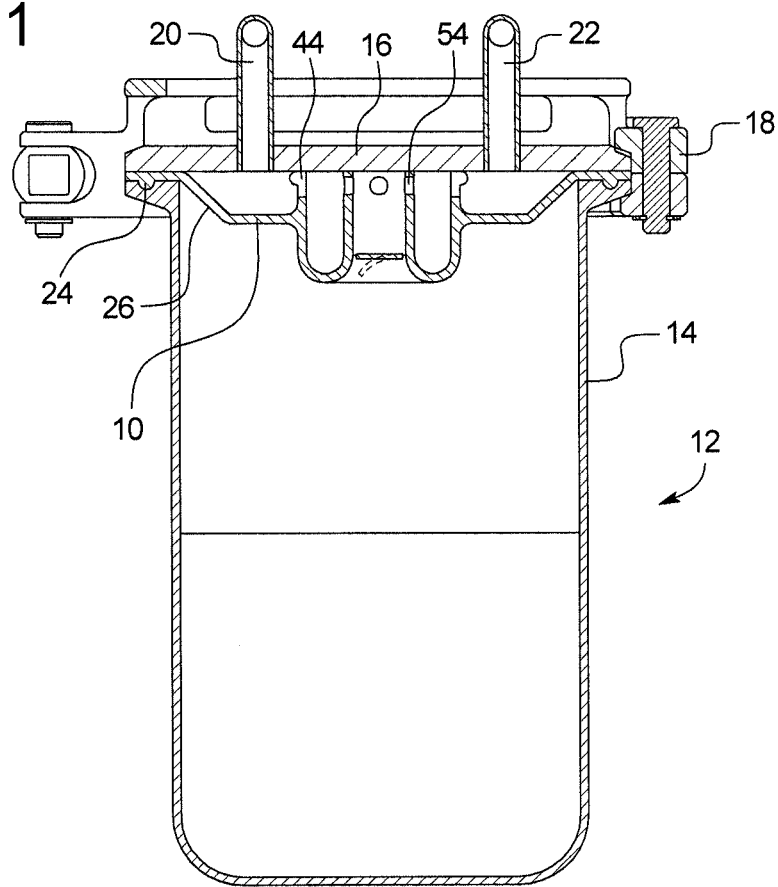
FIG. 1 is a sectional view of a pressure vessel, cap, and seal in a clamp in accordance with the principals of the invention.

FIG. 1 shows a seal 10 used in a batch carbonation device or apparatus 12. Additional details of the batch carbonation device, excluding the seal disclosed herein, are shown in U.S. patent application Ser. No. 13/790,687, the contents of which are herein incorporated by reference in their entirety. The batch carbonation device 12 includes a pressure vessel 14 and cap 16 and a clamping device 18 that removably seals the cap 16, seal 10 and pressure vessel 14. In one aspect, the clamping device 18 includes a sanitary style flange and clamp that holds the components together and maintains pressure between the pressure vessel 14 and cap 16. In one aspect, the cap 16 includes a gas in 20 and gas out 22 port.

Figure 2:
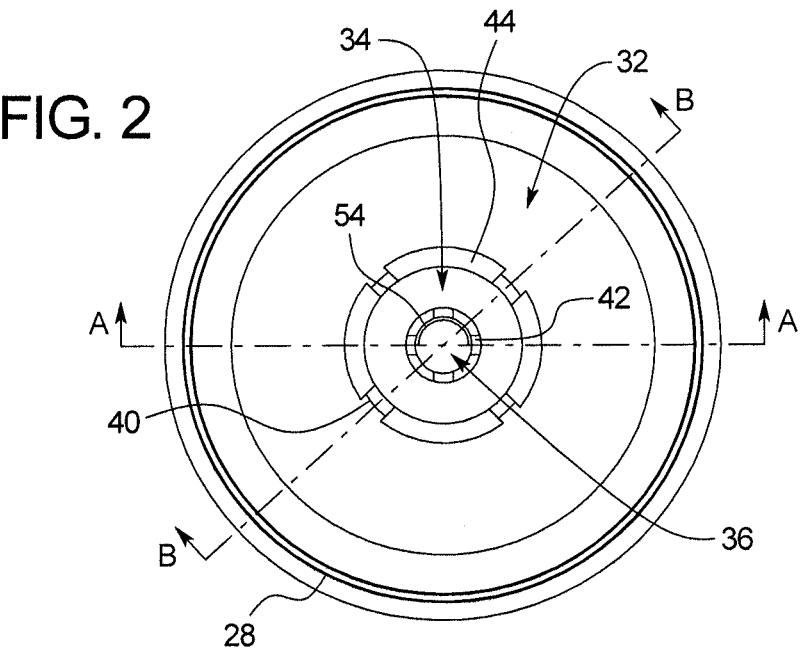
FIG. 2 is a top view of a seal in accordance with the principals of the invention.
Figure 3:
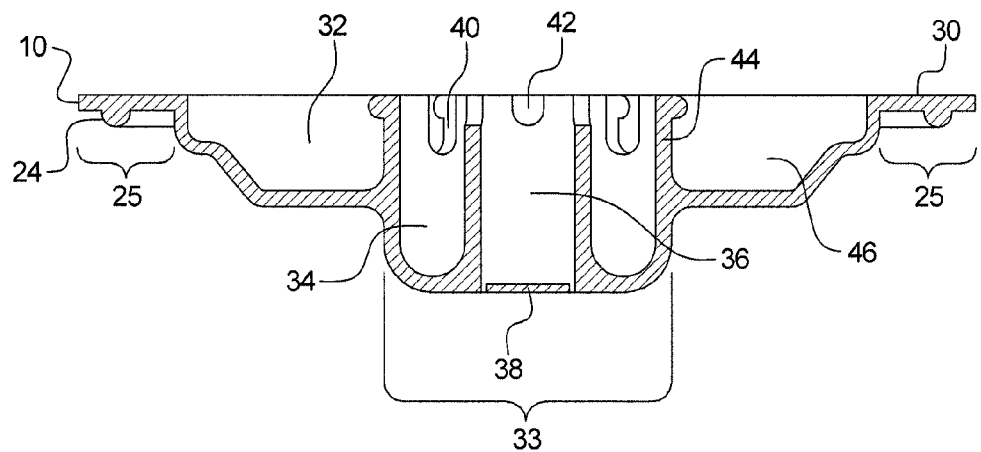
FIG. 3 is a sectional view of the seal of FIG. 2 along line A-A.
Figure 4:
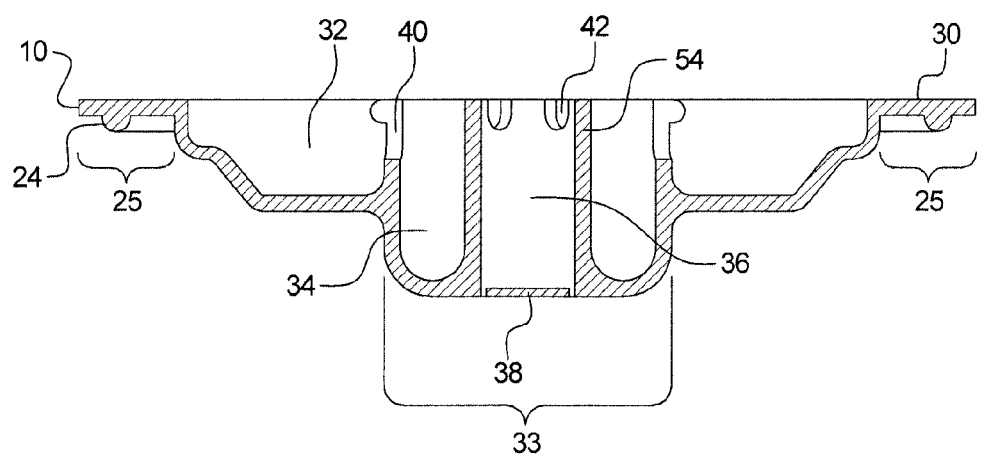
FIG. 4 is a sectional view of the seal of FIG. 2 along line B-B.

FIG. 2 shows an embodiment of the seal 10. The seal body of the seal 10 may be formed of silicone or of any medium durometer memory material, such as BUNA-N. The seal is generally disc shaped, having an outer diameter. The seal 10 has a top surface 30 and a bottom surface 26 opposite the top surface. The seal 10 includes a sealing portion 25 proximate the outer diameter. The sealing portion 25 has an annular ridge, also referred to as a half O-ring structure 24, formed on and extending from the bottom surface 26 proximate the outer diameter. Additionally, annular crush ribs 28 may be formed on a top surface 30. The half O-Ring structure 24 and crush ribs 28 seal the cap 16 and vessel 14 when under pressure during a carbonation cycle.

The seal 10 also includes a circular area or cavity 32, also referred to herein as an outer channel. The outer channel 32 is radially inward from the half o-ring structure 24 and extends downward from the sealing portion 25. The outer channel 32 corresponds to a gas in port 20 and gas out port 22, that extend through the cap 16. The outher channel allows the seal 10 to be placed in various positions without impeding the gas in 20 and gas out 22 ports. The outer channel 32 maximizes the area in the vessel 14 and prevents the seal 10 from impeding the gas out port 22 during depressurizing when a force may be applied to the seal 10 causing it to deform or change shape.

The seal 10 also includes a center section 33 located radially inward of the outer channel 32. The center section includes an annular inner channel 34, a porting cavity 36 and a valve 38. As shown in the embodiment in FIG. 2, the inner channel 34 is concentric to and located inside the outer channel 32. A first wall 44 extends upward from the top surface 30 and separates outer channel 32 and inner channel 34. The porting cavity 36, is located inside of the inner channel 36. A second wall 54 extends upwards from the top surface, and defines porting cavity 36 and separates inner channel 34 and porting cavity 36. The valve 38, shown as a flap valve, allows gas to pass between the vessel 14 and the porting cavity 36. The valve 38 also diffuses the energy of the liquid contained in the vessel 14. The inner channel 34 and the porting cavity 36 are designed to diffuse and trap any liquids that bypass the flap valve 38 and to prevent those liquids from contacting the gas in and gas out ports 20 and 22 to prevent contamination. When the vessel 14 and seal 10 are placed in the carbonation device and clamped down, the flap valve 38 and inner channel 34 and the porting cavity 36 seal relative to the cap 16.

A plurality of first ports 40 are located in the first wall 44 and pneumatically connect outer channel 32 to inner channel 34. A plurality of second ports 42 are located in the second wall 54 and pneumatically connect inner channel 34 to porting cavity 36. The first ports 40 and second ports 42 thereby create a pneumatic circuit between outer channel 32, the inner channel 34 and the porting cavity 36. That pneumatic circuit is sometimes referred to herein as a labyrinth 46. During carbonation and venting stages, gas is allowed to pass through first and second ports 40, 42 to permit gas to pass through the labyrinth 46. By forcing the gas to pass through the labyrinth en route between the gas in and gas out ports and the vessel, the liquid transfer from the vessel 14, including foam that may have been formed during carbonation, to the gas in and gas out ports 20, 22 through the labyrinth 46 is minimized. In one aspect shown in FIG. 2, the first and second ports 40, 42 may be positioned opposite, e.g. 90 degrees, relative to each other to prevent spray from escaping the seal 10 when gas is vented from the vessel 14 during a carbonation cycle. In one aspect, the walls 44 and 54 contact the cap 16 to provide structural rigidity to the seal 10 relative to the cap 16 and to prevent the seal 10 from collapsing against and sealing the gas out port 22 when the vessel 14 is pressurized. Walls 44 and 54 are positioned radially inward with respect to the gas out port 22 and define a boundary of the inner and outer channels 34, 36. It is contemplated that a single first port and single second port could be used.

Figure 8:
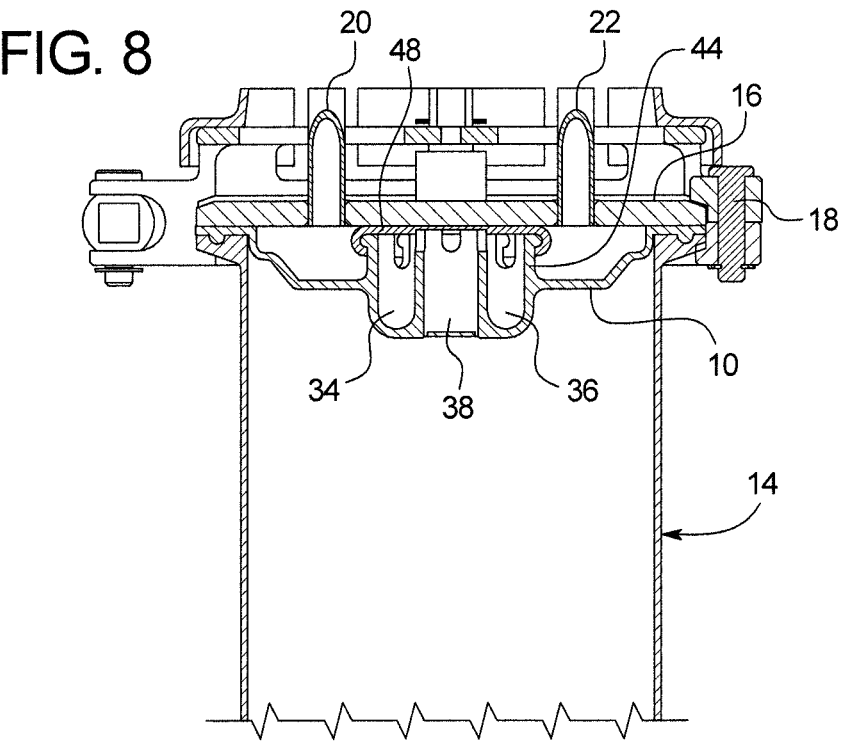
FIG. 8 is a sectional view of an alternate embodiment of a pressure vessel, cap and seal having a cover.
Figure 9:
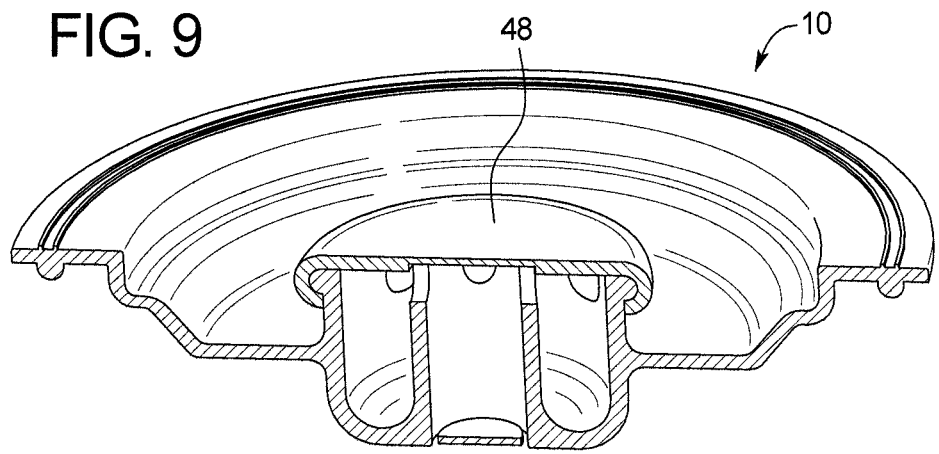
FIG. 9 is a cross sectional perspective view of the seal and cover shown in FIG. 8.
Figure 10:
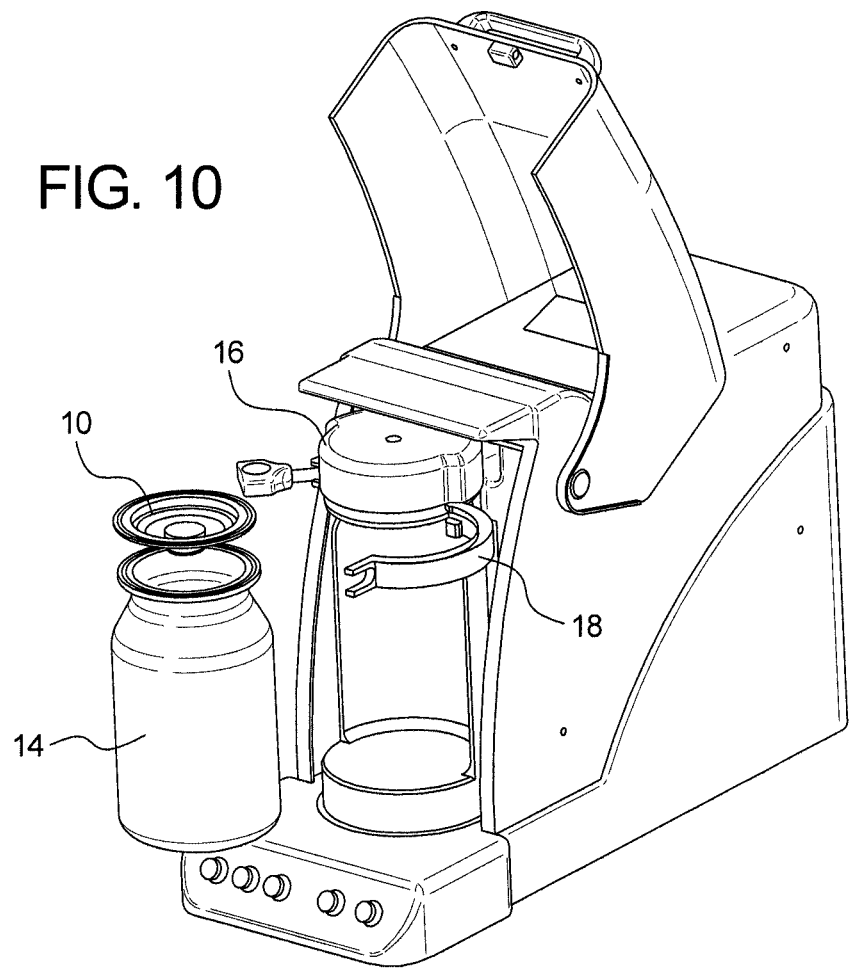
FIG. 10 is a perspective view of a pressure vessel including a seal and a locking mechanism including a cap prior to introduction of the pressure vessel within the housing.

In one embodiment, the center section may include a cover 48 as best seen in FIGS. 8 and 9. The cover 48 may be positioned over the inner channel 34 and porting cavity 36 and may be removed for cleaning. The cover 48 is generally disc shaped, having a sidewall that extends downward to engage wall 44. The cover 48 may minimize any splashing that may occur with the liquid that is contained in the vessel 14 and prevents the liquid from contacting a surface of the cap 16 to maintain a sanitary process and structure for the carbonation device 12.

Figure 5:
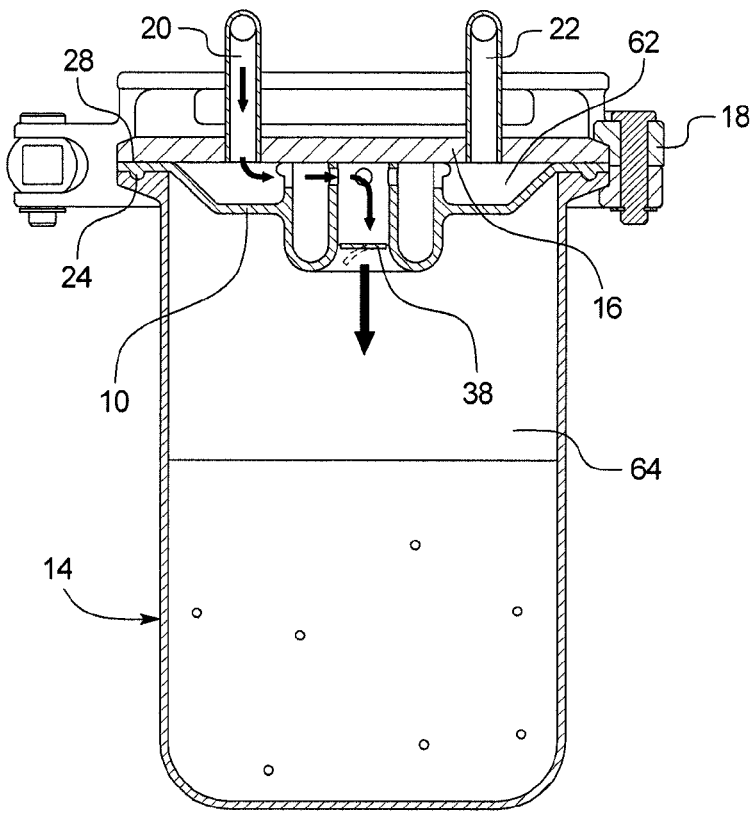
FIG. 5 is a sectional view of the pressure vessel, cap and seal of FIG. 1 illustrating the flow of gas into the pressure vessel during the carbonation stage of a carbonation cycle.
Figure 6:
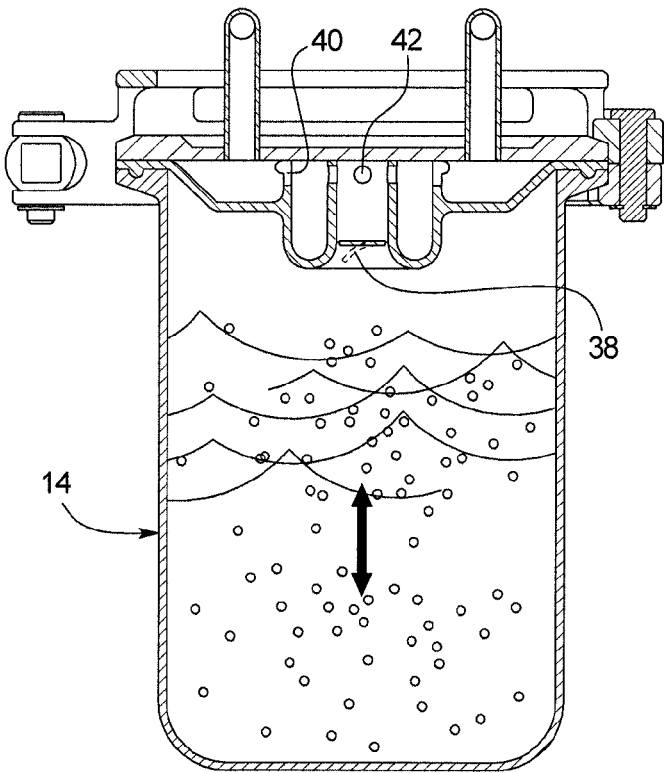
FIG. 6 is a sectional view of the pressure vessel, cap and seal of FIG. 1 illustrating the agitation of liquid and gas in the pressure vessel during the carbonation state of a carbonation cycle.
Figure 7:
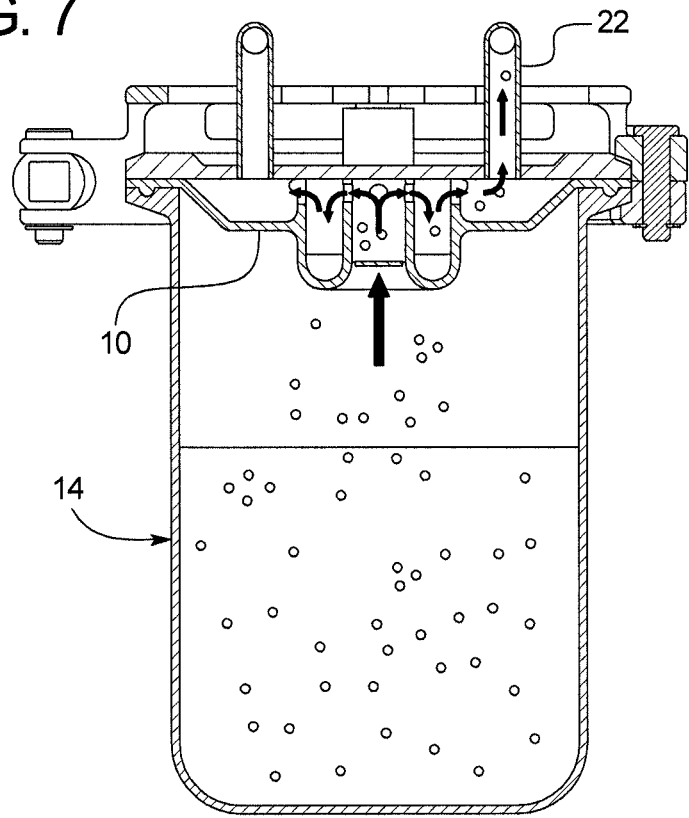
FIG. 7 is a sectional view of the pressure vessel, cap and seal of FIG. 1 illustrating the venting stage of a carbonation cycle.

FIGS. 5-7 illustrate the process of forming a carbonated beverage using the seal 10. As shown in FIG. 5, a non-carbonated liquid is poured into the pressure vessel 14 and the seal 10 is positioned on top of the pressure vessel 14. The half O-ring structure 24 may be used to align the seal 10 relative to a corresponding groove in the pressure vessel 14. Next, the pressure vessel 14 and seal 10 are placed in the carbonation device 12 and the clamp 18 is actuated to compress the seal 10 between the cap 16 and vessel 14 to maintain pressure within the vessel 14. A first chamber 62 is defined between the cap 16 and the seal 10 and a second chamber 64 is defined by the pressure vessel and seal 10.

As shown in FIG. 6 in a next step, gas is metered into the vessel 14 to a desired pressure. During this step, gas flows from the gas in port 20, into the seal 10, through the labyrinth 46 of the seal 10, through the valve 38 in the seal 10 and into the second chamber 64 and the pressure vessel 14.

The pressure vessel 14 is then agitated to carbonate the liquid in the pressure vessel. During the agitation cycle, the structure of the seal 10 diffuses energy during the agitation cycle thus controlling and containing any liquid that exits the vessel 14 through the valve 38 and maintains any such liquid in within the labyrinth 46 of the seal 10, thereby preventing contamination of the gas in and gas out ports 20, 22.

As shown in FIG. 7, when the carbonation cycle is completed, gas is vented from the pressure vessel 14, through the labyrinth 46, to the gas out port 22 at a set rate to reduce foaming and to prevent the escaping gas from transporting liquid or foam to the cap 16 and gas out port 22. When pressure within the vessel reaches a predetermined level, such as 5 PSI or less, the pressure vessel 14 and seal and antifoam device 10 may be removed from the carbonation device 12. Next, the seal and antifoam device 10 may be removed from the vessel 10 allowing the seal and antifoam device to be cleaned and reused. The carbonated liquid may be removed from the vessel 14 to be served as a carbonated beverage.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A seal for use with a pressure vessel and cap having a gas inlet and a gas outlet port comprising:
    a body formed of a sealing material, the body including a sealing portion configured to contact the pressure vessel and cap to seal the cap relative to the pressure vessel; and
    a labyrinth configured to prevent contact of a liquid within the pressure vessel with the gas in and gas out ports during a carbonation process.

2. The seal of claim 1 further comprising ribs formed on a top surface of the seal.

3. The seal of claim 1 further comprising an outer channel extending radially inward from the sealing portion.

4. The seal of claim 3 further comprising a center section having a valve.

5. The seal of claim 4 wherein the center section includes an inner channel and a cavity positioned radially inward from the inner channel.

6. The seal of claim 5 wherein the inner channel and the cavity are configured to diffuse and trap any liquids that bypass the valve during the carbonation process.

7. The seal of claim 4 wherein the valve is a flap valve configured to allow gas to flow there through and to diffuse the energy of the liquid contained in the vessel.

8. The seal of claim 5 further comprising:
    a first wall separating the outer channel from the inner channel;
    a second wall separating the inner channel from the cavity;
    at least one first port formed in the first wall pneumatically connecting the outer channel to the inner channel;
    at least one second port formed in the second wall pneumatically connecting the inner channel to the cavity.

9. The seal of claim 8 wherein the at least one first port is not radially aligned with the at least one second port.

10. The seal of claim 8 wherein the first wall is configured to contact the cap, thereby preventing the seal from collapsing against the gas outlet port when the pressure vessel is pressurized.

11. The seal of claim 5 wherein the center section includes a detachable cover.

12. The seal of claim 8 wherein center section includes a cover removably attached to the first wall.

13. A batch carbonation apparatus comprising:
    a pressure vessel including a cap having a gas inlet port and a gas outlet port,
    a seal device positioned between the cap and the pressure vessel to define a first chamber between the cap and the seal device and a second chamber between the pressure vessel and the seal device, the seal device having a labyrinth configured to permit gas flow from the first chamber to the second chamber, but to prevent liquid within the pressure vessel from contacting the gas inlet and gas outlet ports; and
    a locking mechanism removably locking the cap and seal device relative to the pressure vessel.

14. The batch carbonation apparatus of claim 13 wherein the seal includes a sealing portion that contacts the pressure vessel and cap sealing the cap relative to the pressure vessel.

15. The batch carbonation apparatus of claim 13 wherein the seal includes ribs formed on a top surface of the seal sealing the cap and pressure vessel when under pressure during a carbonation cycle.

16. The batch carbonation apparatus of claim 14 wherein the seal includes an outer channel that extends radially inward from the sealing portion.

17. The batch carbonation apparatus of claim 16 wherein the seal includes a center section having a valve.

18. The batch carbonation apparatus of claim 17 wherein center section further includes an inner channel and a cavity positioned radially inward from the inner channel.

19. The batch carbonation apparatus of claim 18 wherein the inner channel and cavity diffuse and trap any liquids that bypass the valve.

20. The batch carbonation apparatus of claim 17 wherein the valve is a flap valve that allows gas to pass there through and diffuses the energy of the liquid contained in the vessel.

21. The batch carbonation apparatus of claim 18 wherein the seal further comprises:
    a first wall separating the outer channel from the inner channel;
    a second wall separating the inner channel from the cavity:
    at least one first port formed in the first wall pneumatically connecting the outer channel to the inner channel; and
    at least one second port formed in the second wall pneumatically connecting the inner channel to the cavity.

22. The batch carbonation apparatus of claim 21 wherein the at least one first port and the at least one second port are not radially aligned.

23. The batch carbonation apparatus of claim 21 wherein the first wall is configured to contact the cap, thereby preventing the seal from collapsing against the gas outlet port when the pressure vessel is pressurized.

24. The batch carbonation apparatus of claim 18 wherein the center section includes a cover.

* * * * *